United States Patent
Martinez-Heath et al.

(10) Patent No.: US 11,445,422 B2
(45) Date of Patent: Sep. 13, 2022

(54) ADAPTABLE NETWORK COMMUNICATIONS

(71) Applicants: AT&T Intellectual Property I, L.P., Atlanta, GA (US); AT&T Global Network Services France, SAS, Courbevoie (FR); AT&T Intellectual Property II, L.P., Atlanta, GA (US)

(72) Inventors: Miguel R. Martinez-Heath, East Windsor, NJ (US); Aurélien Bruno, Colomars (FR); Scott Sayers, Jackson, NJ (US); Keylor Eng, Seattle, WA (US)

(73) Assignees: AT&T Intellectual Property I, L.P., Atlanta, GA (US); AT&T Global Network Services France, SAS, Courbevoie (FR); AT&T Intellectual Property II, L.P., Atlanta, GA (US)

( * ) Notice: Subject to any disclaimer, the term of this patent is extended or adjusted under 35 U.S.C. 154(b) by 34 days.

(21) Appl. No.: 16/218,756

(22) Filed: Dec. 13, 2018

(65) Prior Publication Data
US 2020/0196214 A1    Jun. 18, 2020

(51) Int. Cl.
*H04W 36/26* (2009.01)
*H04L 43/0876* (2022.01)
(Continued)

(52) U.S. Cl.
CPC .............. *H04W 36/26* (2013.01); *H04L 43/04* (2013.01); *H04L 43/0876* (2013.01);
(Continued)

(58) Field of Classification Search
CPC ..... H04L 43/04; H04L 43/0876; H04L 45/70; H04L 45/302; H04L 47/24; H04M 1/725;
(Continued)

(56) References Cited

U.S. PATENT DOCUMENTS

| 8,995,278 B1* | 3/2015 | Vivanco ............... H04W 36/26 370/237 |
| 9,037,149 B2 | 5/2015 | Rahman et al. |
| 9,178,822 B2 | 11/2015 | Norp et al. |
| 9,338,085 B2 | 5/2016 | Chiang et al. |

(Continued)

FOREIGN PATENT DOCUMENTS

WO    2018128477 A1    7/2018

*Primary Examiner* — Thomas J Dailey (57) ABSTRACT

In one example, a method includes monitoring conditions in a telecommunication service provider network, selecting a first path by which to connect a communication session between a first endpoint and a second endpoint, wherein the first path is a path through the network that is expected to satisfy a predefined level of performance for the communication session based on the conditions, connecting the first endpoint and the second endpoint via the first path, detecting a change in the conditions that results in the first path failing to satisfy the predefined level of performance, selecting a second path by which to connect the communication session, wherein the second path is a path through the network that is expected to satisfy the predefined level of performance for the communication session based on the conditions as changed, and initiating a handoff of the communication session from the first path to the second path.

20 Claims, 3 Drawing Sheets

(51) Int. Cl.
*H04L 45/00* (2022.01)
*H04W 40/12* (2009.01)
*H04W 36/30* (2009.01)
*H04W 28/02* (2009.01)
*H04L 43/04* (2022.01)
*H04M 1/725* (2021.01)
*H04W 76/22* (2018.01)

(52) U.S. Cl.
CPC ............ *H04L 45/70* (2013.01); *H04M 1/725* (2013.01); *H04W 28/0268* (2013.01); *H04W 36/30* (2013.01); *H04W 40/12* (2013.01); *H04W 76/22* (2018.02)

(58) Field of Classification Search
CPC ......... H04M 1/72454; H04W 28/0268; H04W 36/26; H04W 36/30; H04W 40/12; H04W 76/22
See application file for complete search history.

(56) References Cited

U.S. PATENT DOCUMENTS

| | | | |
|---|---|---|---|
| 9,825,840 | B2 | 11/2017 | Krishnamoorthy et al. |
| 9,942,904 | B2 | 4/2018 | Smith et al. |
| 9,961,610 | B2 | 5/2018 | Jung et al. |
| 10,015,832 | B2 | 7/2018 | Zhang et al. |
| 10,064,112 | B2 | 8/2018 | Deivasigamani et al. |
| 10,136,396 | B2 | 11/2018 | Brisebois et al. |
| 2005/0198363 | A1* | 9/2005 | Ling ....................... H04L 67/02 709/236 |
| 2007/0030826 | A1* | 2/2007 | Zhang ............... H04W 36/0011 370/331 |
| 2015/0039687 | A1* | 2/2015 | Waxman ............. H04L 65/1006 709/204 |
| 2015/0180748 | A1* | 6/2015 | Ding ....................... H04L 67/42 709/224 |
| 2016/0285752 | A1* | 9/2016 | Joshi ..................... H04L 45/302 |
| 2016/0294681 | A1* | 10/2016 | Khakpour ............ H04L 45/306 |
| 2017/0078186 | A1* | 3/2017 | Thyni ................... H04L 45/124 |
| 2018/0103498 | A1 | 4/2018 | Subhan et al. |
| 2018/0270676 | A1 | 9/2018 | Guven et al. |

* cited by examiner

ADAPTABLE NETWORK COMMUNICATIONS

The present disclosure relates generally to mobile communications, and relates more particularly to devices, computer-readable media and methods for adapting network communications to optimize performance.

BACKGROUND

Landline telephony systems are designed to provide top performance at all times, including times of peak customer utilization. Mobility network operators also strive to provide the best possible network performance for their subscribers.

SUMMARY

In one example, devices, computer-readable media, and methods for adapting network communications to optimize performance are disclosed. In one example, a method includes monitoring conditions in a telecommunication service provider network, selecting a first path by which to connect a communication session between a first endpoint and a second endpoint, wherein the first path is a path through the telecommunication service provider network that is expected to satisfy a predefined level of performance for the communication session based on the conditions, connecting the first endpoint and the second endpoint via the first path, detecting a change in the conditions that results in the first path failing to satisfy the predefined level of performance, selecting a second path by which to connect the communication session, wherein the second path is a path through the telecommunication service provider network that is expected to satisfy the predefined level of performance for the communication session based on the conditions as changed, and initiating a handoff of the communication session from the first path to the second path.

In another example, a non-transitory computer-readable medium stores instructions which, when executed by a processor, cause the processor to perform operations. The operations include monitoring conditions in a telecommunication service provider network, selecting a first path by which to connect a communication session between a first endpoint and a second endpoint, wherein the first path is a path through the telecommunication service provider network that is expected to satisfy a predefined level of performance for the communication session based on the conditions, connecting the first endpoint and the second endpoint via the first path, detecting a change in the conditions that results in the first path failing to satisfy the predefined level of performance, selecting a second path by which to connect the communication session, wherein the second path is a path through the telecommunication service provider network that is expected to satisfy the predefined level of performance for the communication session based on the conditions as changed, and initiating a handoff of the communication session from the first path to the second path.

In another example, a device includes a processor and a non-transitory computer-readable medium that stores instructions which, when executed by a processor, cause the processor to perform operations. The operations include monitoring conditions in a telecommunication service provider network, selecting a first path by which to connect a communication session between a first endpoint and a second endpoint, wherein the first path is a path through the telecommunication service provider network that is expected to satisfy a predefined level of performance for the communication session based on the conditions, connecting the first endpoint and the second endpoint via the first path, detecting a change in the conditions that results in the first path failing to satisfy the predefined level of performance, selecting a second path by which to connect the communication session, wherein the second path is a path through the telecommunication service provider network that is expected to satisfy the predefined level of performance for the communication session based on the conditions as changed, and initiating a handoff of the communication session from the first path to the second path.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses devices, computer-readable media, and methods for adapting network communications to optimize performance. As discussed above, mobility network operators strive to provide the best possible network performance for their subscribers. In mobility networks, however, network conditions such as latency, throughput, bandwidth, and jitter may change frequently, and such changes may lead to poor and/or inconsistent performance. Moreover, the various communication standards (e.g., Wi-Fi, various generations of long term evolution (LTE), 5G, etc.) that may be available for communicating via the network may prioritize different types of communications (e.g., voice, data, etc.) differently.

Examples of the present disclosure enable a user endpoint device to monitor the conditions in a mobility network through communication with a network-side device. Based on the network conditions and on a predefined performance level for a communication session, the user endpoint device may select a path for connecting the communication session. The user endpoint device may continue to monitor the network conditions throughout the communication session, and may adapt the communication session at any time (e.g., by changing to a new path) to ensure that the predefined performance level continues to be met. This capability may be especially useful during times of high network usage, such as during emergencies.

Examples of the present disclosure are implemented through an Over-the-Top (OTT) application, e.g., an application which allows user endpoint devices to communicate with each other via the Internet rather than over a dedicated telecommunications channel. The application may run on the user endpoint devices as well as on a network-side device (e.g., in the "cloud"). Examples of the application may leverage an open-source technology such as Web Real-Time Communication (WebRTC). WebRTC is a collection of technologies that allows users to send real-time communications, including voice, video, and other data to a destination from an application, e.g., a web browser or mobile application, without the use of plug-ins or third-party software. In one example, the application is implemented as a WebRTC heuristic engine. The heuristic engine may operate in the endpoint device's Trusted Execution Environment (TEE) and may communicate with a similarly configured heuristic engine operating on the network-side device. In one example, the network-side device may comprise an application server connected to a Gateway GPRS Support Node (GGSN) or Packet Data Network (PDN) gateway that may receive all WebRTC traffic for the endpoint device from the GGSN or PDN gateway. These and other aspects of the present disclosure are discussed in greater detail below in connection with the examples of FIGS. 1-3.

Figure 1:
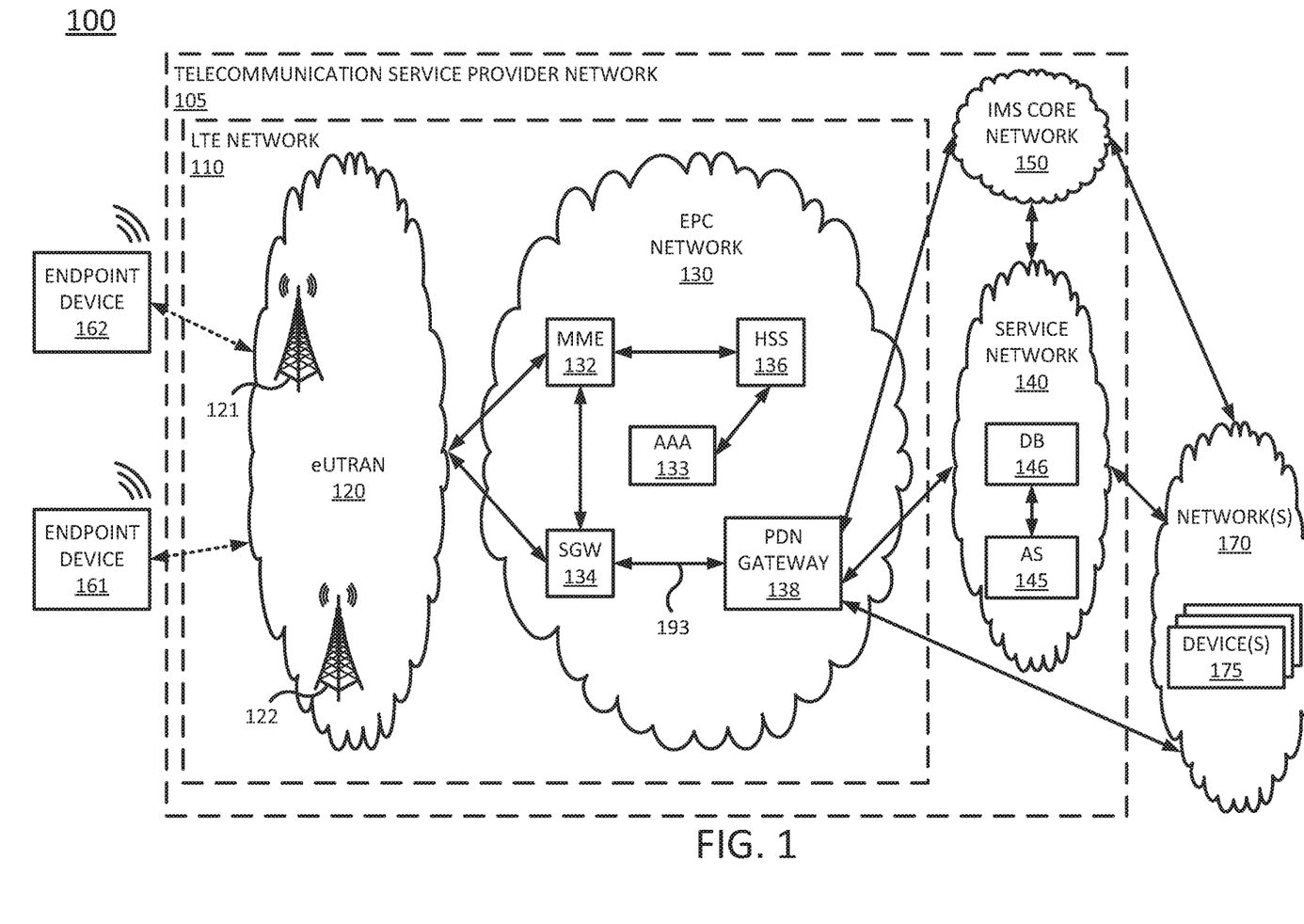
FIG. 1 illustrates an example network, or system that may implement examples of the present disclosure for adapting network communications to optimize performance.

To better understand the present disclosure, FIG. 1 illustrates an example network, or system 100 that may implement examples of the present disclosure for adapting network communications to optimize performance. In one example, the system 100 includes a telecommunication service provider network 105. The telecommunication service provider network 105 may comprise a Long Term Evolution (LTE) network 110, a service network 140, and a core network, e.g., an IP Multimedia Subsystem (IMS) core network 150. The system 100 may further include other networks 170 connected to the telecommunication service provider network 105. As shown in FIG. 1, the system 100 may connect endpoint devices 161 and 162 with each other and with the application server (AS) 145 in service network 140, with devices 175 in networks 170, and/or with other components of telecommunication service provider network 105. The endpoint devices 161 and 162 may each comprise a cellular telephone, a smartphone, a tablet computing device, a laptop computer, a pair of computing glasses, a wireless enabled wristwatch, a wearable smart device (e.g., a fitness tracker), or any other wireless and/or cellular-capable mobile telephony and computing devices (broadly, a "mobile endpoint device"). In one example, the endpoint devices 161 and 162 may each comprise a device of a subscriber or customer of the telecommunication service provider network 105.

In one example, endpoint device 161 and/or endpoint device 162 are configured to monitor, e.g., via an OTT application, the conditions of the system 100 and, in response to the initiation of a communication session, determine the best path for supporting the communication session. Within the context of the present disclosure, a "path" refers to the means of connection used to establish a communication session between two or more endpoint devices. For instance, a connection could be established through a dedicated communication path, OTT, through a web application, or through other means.

The application may communicate with an application running in the network, e.g., on an application server operated by the telecommunications service provider or another device, to collect information about the network conditions. The application may run in the background of the endpoint device 161 and/or the endpoint device 162, e.g., so that the application's knowledge of the network conditions is always up-to-date when a user initiates a communication session. This may reduce delays in initiating communication sessions.

As used herein, the terms "instantiate," "configure," and "reconfigure" may refer to programming or loading a computing device with computer-readable/computer-executable instructions, code, and/or programs, e.g., in a memory, which when executed by a processor of the computing device, may cause the computing device to perform various functions. In addition, such terms may comprise provisioning, allocating or assigning other resources of a computing device to a component, such as all or a portion of a memory, an attached data storage unit, and so forth.

In one example, the LTE network 110 comprises an access network and a core network. For example, as illustrated in FIG. 1, LTE network 110 may comprise an evolved Universal Terrestrial Radio Access Network (eUTRAN) 120 and an evolved packet core (EPC) network 130. The eUTRANs are the air interfaces of the $3^{rd}$ Generation Partnership Project (3GPP) LTE specifications for mobile networks. In one example, EPC network 130 provides various functions that support wireless services in the LTE environment. In one example, EPC network 130 is an Internet Protocol (IP) packet core network that supports both real-time and non-real-time service delivery across a LTE network, e.g., as specified by the 3GPP standards. In one example, all eNodeBs, e.g., including eNodeB (eNB) 121 and eNodeB (eNB) 122 in the eUTRAN 120, are in communication with the EPC network 130. In operation, LTE user equipment or user endpoints (UE), such as endpoint devices 161 and 162, may access wireless services via the eNodeBs 121 and 122 located in eUTRAN 120. It should be noted that any number of eNodeBs can be deployed in the eUTRAN.

In EPC network 130, network devices Mobility Management Entity (MME) 132 and Serving Gateway (SGW) 134 support various functions as part of the LTE network 110. For example, MME 132 is the control node for the LTE access networks, e.g., including eUTRAN 120. In one example, MME 132 is responsible for user equipment tracking and paging (e.g., such as retransmissions), bearer activation and deactivation process, selection of the SGW, e.g., SGW 134, and user authentication. In one example, SGW 134 routes and forwards user data packets, while also acting as the mobility anchor for the user plane during inter-eNodeB handovers and as the anchor for mobility between LTE and other wireless technologies, such as 2G and 3G wireless networks.

In addition, EPC (common backbone) network 130 may comprise a Home Subscriber Server (HSS) 136 that contains subscription-related information (e.g., subscriber profiles), registration data, and network policy rules, and that performs authentication and authorization of a wireless service user. Thus, HSS 136 may store information regarding various subscriber/customer devices, such as endpoint devices 161 and 162. HSS 136 may also maintain and provide information about subscribers' locations. In one example, Authentication, Authorization, and/or Accounting (AAA) server 133 obtains subscriber profile information from HSS 136 to authenticate and authorize endpoint devices to connect to EPC network 130 via Institute for Electrical and Electronics Engineers (IEEE) 802.11 (Wi-Fi)/non-3GPP access networks.

The EPC network 130 may also comprise a packet data network (PDN) gateway 138 which serves as a gateway that provides access between the EPC network 130 and various data networks, e.g., service network 140, IMS core network 150, networks 170, and the like. The packet data network gateway 138 is also referred to as a PDN gateway, a PDN GW or a PGW.

In one example, service network 140 may comprise one or more devices, such as application server (AS) 145 for providing services to subscribers, customers, and or users. For example, telecommunication service provider network 105 may provide a cloud storage service, web server hosting, and other services. As such, service network 140 may represent aspects of telecommunication service provider network 105 where infrastructure for supporting such services may be deployed. In one example, AS 145 may comprise a computing system, such as computing system 300 depicted in FIG. 3, specifically configured to provide one or more service functions in accordance with the present disclosure, such as to provide information about network conditions to applications running on endpoint devices (e.g., endpoint devices 161 and/or 162). These service functions may be exposed to endpoint devices 161 and 162 via application programming interfaces (APIs). Although a single application server, AS 145, is illustrated in service network 140, it should be understood that service network 140 may include any number of components to support one or more services that may be provided to one or more subscribers, customers, or users by the telecommunication service provider network 105.

In one example, networks 170 may represent one or more enterprise networks, a circuit switched network (e.g., a public switched telephone network (PSTN)), a cable network, a digital subscriber line (DSL) network, a metropolitan area network (MAN), an Internet service provider (ISP) network, and the like. In one example, the other networks 170 may include different types of networks. In another example, the other networks 170 may be the same type of network. In one example, the other networks 170 may represent the Internet in general. Devices 175 may include servers, such as web servers, storage devices, enterprise servers, email servers, and so forth. Devices 175 may also include personal computers, desktop computers, laptop computers, personal digital assistants (PDAs), tablet computing devices, or any other devices for wireless and/or wired communications. In one example, endpoint devices 161 and 162 may communicate with devices 175 in networks 170 via PDN GW 138 and/or via PDN GW 138 and IMS core network 150, e.g., for voice over LTE (VoLTE)-based calls or Wi-Fi calling.

It should be noted that the system 100 has been simplified. In other words, the system 100 may be implemented in a different form than that which is illustrated in FIG. 1. For example, the system 100 may be expanded to include additional networks, such as network operations center (NOC) networks, additional eUTRANs, and so forth. The system 100 may also be expanded to include additional network elements such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, one or more functions of the present disclosure for adapting network communications to optimize performance may be deployed in AS 145 in service network 140, or in another device that is external to the EPC network 130. In addition, various elements of eUTRAN 120, EPC network 130, and IMS core network 150 may be omitted for clarity, including gateways or border elements providing connectivity between such networks, such as a home subscriber server (HSS), an authenticating, authorization and accounting (AAA) server, a security gateway (SeGW), and so forth. Similarly, due to the relatively large number of connections available between devices in the system 100, various links between various components of system 100 are also omitted for clarity.

In addition, although aspects of the present disclosure have been discussed above in the context of a long term evolution (LTE)-based network, examples of the present disclosure are not so limited. For example, the teachings of the present disclosure can be applied to other types of cellular networks (e.g., a 2G network, a 3G network, a 5G network, and the like, or a future technology or standard-based network). For instance, examples of the present disclosure may implement packet data protocol (PDP) contexts for endpoint devices accessing data services through a gateway General Packet Radio Service (GPRS) support node (GGSN) instead of an EPS bearer associated with PDN GW 138. Thus, these and other modifications are all contemplated within the scope of the present disclosure.

Figure 2:
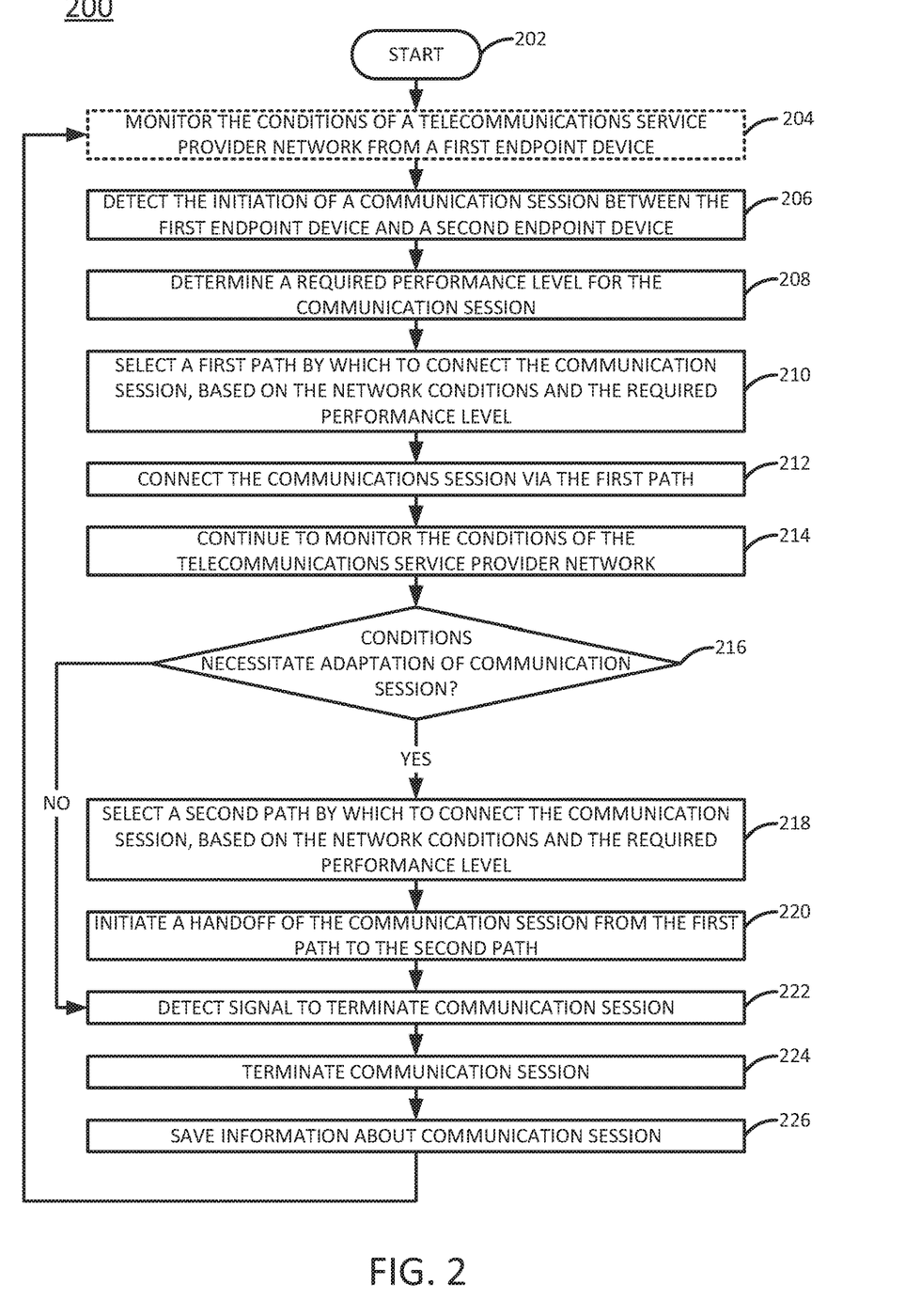
FIG. 2 illustrates a flowchart of an example method for adapting network communications to optimize performance, in accordance with the present disclosure.

FIG. 2 illustrates a flowchart of an example method 200 for adapting network communications to optimize performance, in accordance with the present disclosure. In one example, steps, functions and/or operations of the method 200 may be performed by a user endpoint device, e.g., such as endpoint devices 161 and 162 in FIG. 1. In another example, the steps, functions, or operations of method 200 may be performed by a computing device or system 300, and/or processor 302 as described in connection with FIG. 3 below. For example, the system 300 may represent an endpoint device, in accordance with the present disclosure. For illustrative purposes, the method 200 is described in greater detail below in connection with an example performed by a processor or a first endpoint device, such as processor 302. The method begins in step 202 and proceeds to step 204.

In optional step 204 (illustrated in phantom), the processor may monitor the conditions of a telecommunications service provider network (e.g., telecommunication service provider network 105 of FIG. 1). As discussed above, the processor may execute an application that operates in the background of an endpoint device to continuously monitor the network conditions. For instance, the processor may communicate with a network-side device, such as an application server (e.g., AS 145 of FIG. 1) that provides continuous or regular information about the network conditions (e.g., latency, bandwidth, throughput, jitter, etc.). The network-side device may perform the computation related to monitoring the network conditions (e.g., receiving raw data from network elements, processing the raw data, etc.) and may report metrics indicative of the conditions to the application running on the first endpoint device.

In step 206, the processor may detect an initiation of a communication session involving the first endpoint device. For instance, the user of the first endpoint device may launch an application for establishing a communication, such as a voice calling application, a video calling application, a text messaging application, or the like. The initiation of the communication session may identify the second endpoint device (e.g., by phone number, IP address, or the like) with which the user wishes to communicate and the modality through which the user wishes to communicate (e.g., a voice call, a video call, a text message, etc.). Alternatively, a user of the second endpoint device may attempt to initiate a communication session with the first endpoint device.

In step 208, the processor may determine a required performance level for the communication session. For instance, a service level agreement (SLA) or a user profile accessible to the processor may identify a predefined performance level for one or more types of communications. The predefined performance level may vary based on modality. For instance, the predefined performance level for a voice call may be different from the predefined performance level for a video call.

In step 210, the processor may select a first path by which to connect the communication session, based on the current network conditions and the required performance level. As discussed above, the first path may encompass the means of connection used to establish the communication session between the first endpoint device and the second endpoint device. In one example, the first path is the means of connection that is expected, based on the current network conditions, to satisfy the predefined level of service associated with the communication session. For instance, the user of the first endpoint device may wish to send a text message to the second endpoint device while engaged in a voice call with the user of the second endpoint device. In this case, VoLTE would allow the text message to be sent without terminating the voice call. However, VoLTE typically prioritizes voice communications over data communications. Thus, if the current network bandwidth is limited due to a large number of VoLTE voice communications, data communications may be temporarily throttled, and VoLTE may therefore present a sub-optimal choice for sending the text message.

In one example, the processor may rank a plurality of potential paths, where the rank of a given path indicates an expected performance of the given path relative to other potential paths. The first path may be the top-ranked path among the plurality of potential paths. The top x-ranked paths may optionally be presented to the user of the first endpoint device for selection.

In step 212, the processor may connect the communication session via the first path identified in step 210. Thus, step 212 may establish the communication session between the first endpoint device and the second endpoint device.

In step 214, the processor may continue to monitor the conditions of the telecommunication service provider network via communication with the network-side device. Thus, step 214 may be performed in a manner similar to step 204.

In step 216, the processor may determine whether the network conditions necessitate adapting the communication session, e.g., by selecting a new path by which to connect the communication session. For instance, a change in the network conditions may result in a sub-optimal performance of the first path (e.g., a performance that does not meet the predefined level of performance or that comes within some threshold of not meeting the predefined level of performance). As such, it may be necessary to select a new path in order to maintain the predefined level of service.

If the processor determines in step 216 that it is necessary to adapt the current communication session, then the method 200 may proceed to step 218. In step 218, the processor may select a second path for carrying out the communication session, based on the current network conditions. The second path may be identified in the same manner in which the first path was identified in step 210. Thus, the second path is a path that is expected, based on the changed network conditions, to best satisfy the predefined level of service associated with the communication session.

In step 220, the processor may initiate a handoff of the current communication session from the first path to the second path. In one example, this handoff is performed in a manner that is transparent to the users of the first endpoint device and the second endpoint device (e.g., there is no noticeable disruption of the communication session).

In step 222, the processor may detect a signal to terminate the communication session. In one example, the signal may be initiated by a user of the first endpoint device (e.g., by pressing a button on the user interface to end a voice or video call). The signal could similarly be initiated by a user of the second endpoint device. The signal could also comprise a signal from the second endpoint device indicating that a message has been delivered (e.g., a text message). It should be noted that if the processor determines in step 216 that it is not necessary to adapt the communication session, then the method 200 may proceed directly from step 216 to step 222 (i.e., bypassing steps 218-220).

In step 224, the processor may terminate the communication session.

In step 226, the processor may save information about the communication session (e.g., modality used, path(s) used, level(s) of performance observed during communication session, network conditions observed during communication session, etc.). This information may help the processor to evaluate paths for future communication sessions, e.g., by refining the processor's understanding of the relationships between modalities, network conditions, and performance. Thus, when determining a best path for a future communication session, the determination may be informed by observations of past communication sessions.

The method 200 may then return to step 204 and continue to monitor the network conditions until the user of the first endpoint initiates a new communication session.

In some examples, the method 200 may be used to adapt the path by which a communication session connects not because a change in network conditions results in a current path performing poorly, but because the change may result in an alternate path performing better. For instance, the method 200 could be used to ensure that a communication session is always connecting over the best possible path, even though the communication session may easily satisfy a predefined level of performance.

It should be noted that although not specifically specified, one or more steps, functions or operations of the method 200 may include a storing, displaying and/or outputting step as required for a particular application. In other words, any data, records, fields, and/or intermediate results discussed in the method 200 can be stored, displayed and/or outputted to another device as required for a particular application. Furthermore, steps or blocks in FIG. 2 that recite a determining operation or involve a decision do not necessarily require that both branches of the determining operation be practiced. In other words, one of the branches of the determining operation can be deemed as an optional step. In addition, one or more steps, blocks, functions, or operations of the above described method 200 may comprise optional steps, or can be combined, separated, and/or performed in a different order from that described above, without departing from the example examples of the present disclosure. Furthermore, the use of the term "optional step" is intended to only reflect different variations of a particular illustrative example and is not intended to indicate that steps not labelled as optional steps to be deemed to be essential steps.

Figure 3:
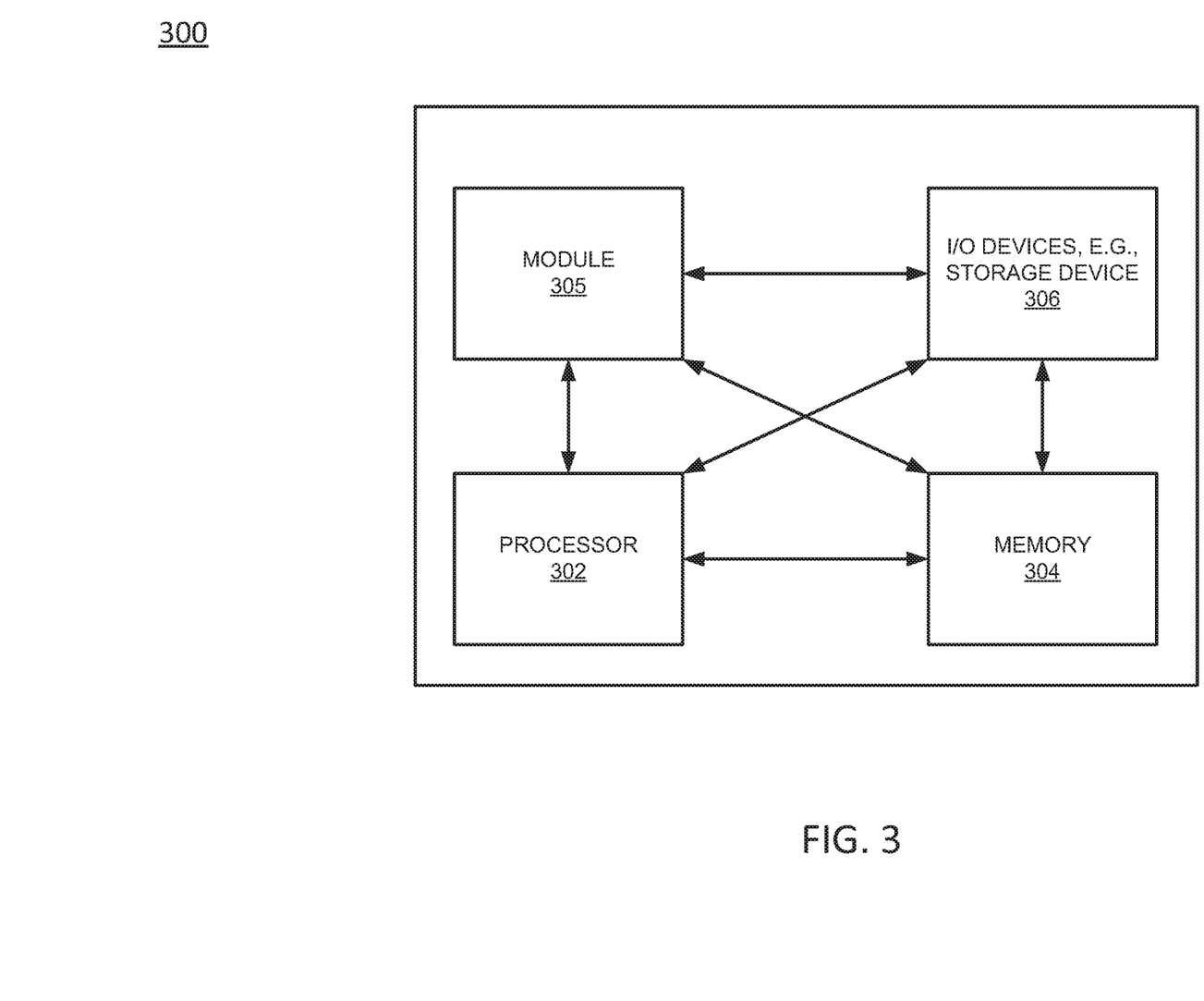
FIG. 3 illustrates an example high-level block diagram of a computer specifically programmed to perform the steps, functions, blocks, and/or operations described herein.

FIG. 3 depicts a high-level block diagram of a computing device suitable for use in performing the functions described herein. As depicted in FIG. 3, the system 300 comprises one or more hardware processor elements 302 (e.g., a central processing unit (CPU), a microprocessor, or a multi-core processor), a memory 304 (e.g., random access memory (RAM) and/or read only memory (ROM)), a module 305 for adapting network communications to optimize performance, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 as discussed above is implemented in a distributed or parallel manner for a particular illustrative example, i.e., the steps of the above method 200, or the entire method 200 is implemented across multiple or parallel computing device, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200. In one example, instructions and data for the present module or process 305 for adapting network communications to optimize performance (e.g., a software program comprising computer-executable instructions) can be loaded into memory 304 and executed by hardware processor element 302 to implement the steps, functions or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 305 for adapting network communications to optimize performance (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not a limitation. Thus, the breadth and scope of a preferred example should not be limited by any of the above-described exemplary examples, but should be defined only in accordance with the following claims and their equivalents.

What is claimed is:

1. A method comprising:
obtaining, by a processor of a first user endpoint device, conditions in a telecommunication service provider network from a server of the telecommunication service provider network via an over-the-top web real-time communication application of the first user endpoint device operating in a background of the first user endpoint device on an ongoing basis, wherein the conditions comprise at least one of: latency, bandwidth, throughput, or jitter;
selecting, by the processor, a first path by which to connect a communication session between the first user endpoint device and a second user endpoint device, wherein the first path is a path through the telecommunication service provider network that is expected to satisfy a predefined level of performance for the communication session based on the conditions, wherein the communication session comprises a web real-time communication session;
connecting, by the processor, the communication session between the first user endpoint device and the second user endpoint device via the first path;
detecting, by the processor, a change in the conditions that results in the first path failing to satisfy the predefined level of performance, wherein the detecting of the change in conditions comprises obtaining the change in the conditions from the server of the telecommunication service provider network via the over-the-top web real-time communication application of the first user endpoint device;
selecting, by the processor, a second path by which to connect the communication session, wherein the second path is a path through the telecommunication service provider network that is expected to satisfy the predefined level of performance for the communication session based on the conditions as changed, wherein the first path is established via a first type of network communication technology, and wherein the second path is established via a second type of network communication technology that is different from the first type of network communication technology; and
initiating, by the processor, a handoff of the communication session from the first path to the second path.

2. The method of claim 1, wherein the server computes the conditions based on raw data from network elements of the telecommunication service provider network.

3. The method of claim 1, further comprising:
detecting, by the processor, an initiation of the communication session by a user of the first user endpoint device; and
identifying, by the processor, a modality of the communication session.

4. The method of claim 3, wherein the modality comprises a voice call.

5. The method of claim 3, wherein the modality comprises a video call.

6. The method of claim 3, wherein the modality comprises a text message.

7. The method of claim 3, wherein the predefined level of performance varies depending on the modality.

8. The method of claim 3, wherein the initiation of the communication session is detected through a launch of an application for establishing the communication session on the first user endpoint device.

9. The method of claim 1, further comprising:
detecting, by the processor, an initiation of the communication session by a user of the second user endpoint device; and
identifying, by the processor, a modality of the communication session.

10. The method of claim 1, wherein the selecting the first path comprises:
ranking, by the processor, a plurality of potential paths comprising at least the first path and the second path, wherein each path of the plurality of potential paths is ranked according to an expected performance of the each path under the conditions; and
selecting, by the processor, the first path as a path of the plurality of potential paths whose expected performance is best.

11. The method of claim 1, wherein the selecting the first path comprises:
ranking, by the processor, a plurality of potential paths comprising at least the first path and the second path, wherein each path of the plurality of potential paths is ranked according to an expected performance of the each path under the conditions;
presenting, by the processor, a number of paths from the plurality of potential paths whose expected performance is best to a user of the first user endpoint device; and
receiving, by the processor, a selection of the first path of the number of paths from the user of the first user endpoint device.

12. The method of claim 1, wherein the handoff is initiated in a manner that is transparent to a user of the first user endpoint device and a user of the second user endpoint device.

13. The method of claim 1, further comprising:
saving, by the processor, information about the communication session, after the communication session is terminated.

14. The method of claim 13, wherein the information comprises a modality of the communication session.

15. The method of claim 13, wherein the information comprises respective performances of the first path and the second path.

16. The method of claim 13, wherein the information is used to select a path for a future communication session.

17. The method of claim 1, wherein the first user endpoint device is a mobile phone.

18. A non-transitory computer-readable medium storing instructions which, when executed by a processor of a first user endpoint device, cause the processor to perform operations, the operations comprising:
obtaining conditions in a telecommunication service provider network from a server of the telecommunication service provider network via an over-the-top web real-time communication application of the first user endpoint device operating in a background of the first user endpoint device on an ongoing basis, wherein the conditions comprise at least one of: latency, bandwidth, throughput, or jitter;
selecting a first path by which to connect a communication session between the first user endpoint device and a second user endpoint device, wherein the first path is a path through the telecommunication service provider network that is expected to satisfy a predefined level of performance for the communication session based on the conditions, wherein the communication session comprises a web real-time communication session;
connecting the communication session between the first user endpoint device and the second user endpoint device via the first path;
detecting a change in the conditions that results in the first path failing to satisfy the predefined level of performance, wherein the detecting of the change in conditions comprises obtaining the change in the conditions from the server of the telecommunication service provider network via the over-the-top web real-time communication application of the first user endpoint device;
selecting a second path by which to connect the communication session, wherein the second path is a path through the telecommunication service provider network that is expected to satisfy the predefined level of performance for the communication session based on the conditions as changed, wherein the first path is established via a first type of network communication technology, and wherein the second path is established via a second type of network communication technology that is different from the first type of network communication technology; and
initiating a handoff of the communication session from the first path to the second path.

19. A first user endpoint device comprising:
a processor; and
a computer-readable medium storing instructions which, when executed by the processor, cause the processor to perform operations, the operations comprising:
obtaining conditions in a telecommunication service provider network from a server of the telecommunication service provider network via an over-the-top web real-time communication application of the first user endpoint device operating in a background of the first user endpoint device on an ongoing basis, wherein the conditions comprise at least one of: latency, bandwidth, throughput, or jitter;
selecting a first path by which to connect a communication session between the first user endpoint device and a second user endpoint device, wherein the first path is a path through the telecommunication service provider network that is expected to satisfy a predefined level of performance for the communication session based on the conditions, wherein the communication session comprises a web real-time communication session;
connecting the communication session between the first user endpoint device and the second user endpoint device via the first path;
detecting a change in the conditions that results in the first path failing to satisfy the predefined level of performance, wherein the detecting of the change in conditions comprises obtaining the change in the conditions from the server of the telecommunication service provider network via the over-the-top web real-time communication application of the first user endpoint device;
selecting a second path by which to connect the communication session, wherein the second path is a path through the telecommunication service provider network that is expected to satisfy the predefined level of performance for the communication session based on the conditions as changed, wherein the first path is established via a first type of network communication technology, and wherein the second path is established via a second type of network communication technology that is different from the first type of network communication technology; and initiating a handoff of the communication session from the first path to the second path.

20. The first user endpoint device of claim 19, the operations further comprising:

detecting an initiation of the communication session by a user of the first user endpoint device; and identifying a modality of the communication session.

\* \* \* \* \*